(12) United States Patent
Motoda et al.

(10) Patent No.: US 10,563,697 B2
(45) Date of Patent: Feb. 18, 2020

(54) ROLLING BEARING AND PRODUCTION PROCESS THEREFOR

(71) Applicant: NSK LTD., Tokyo (JP)

(72) Inventors: Tomohiro Motoda, Fujisawa (JP); Hideyuki Uyama, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/064,363

(22) PCT Filed: Aug. 25, 2017

(86) PCT No.: PCT/JP2017/030464
§ 371 (c)(1),
(2) Date: Jun. 20, 2018

(87) PCT Pub. No.: WO2018/038241
PCT Pub. Date: Mar. 1, 2018

(65) Prior Publication Data
US 2019/0003529 A1 Jan. 3, 2019

(30) Foreign Application Priority Data

Aug. 26, 2016 (JP) .................................. 2016-165994
Aug. 8, 2017 (JP) .................................. 2017-153165

(51) Int. Cl.
*F16C 33/62* (2006.01)
*F16C 33/66* (2006.01)
*F16C 19/06* (2006.01)

(52) U.S. Cl.
CPC .......... *F16C 33/62* (2013.01); *F16C 33/6696* (2013.01); *F16C 19/06* (2013.01); *F16C 2202/52* (2013.01); *F16C 2223/30* (2013.01)

(58) Field of Classification Search
CPC ...... F16C 19/06; F16C 33/62; F16C 33/6696; F16C 2202/52; F16C 2223/30
See application file for complete search history.

(56) References Cited

U.S. PATENT DOCUMENTS 5,207,513 A * 5/1993 Kondo .................... F16C 33/32
384/492
6,234,679 B1 5/2001 Sjostrom
(Continued)

FOREIGN PATENT DOCUMENTS

| CN | 1254061 A | 5/2000 |
| CN | 102399492 A | 4/2012 |

(Continued)

OTHER PUBLICATIONS

Machine Translation of JP 2012-06355 (Year: 2012).*
(Continued)

*Primary Examiner* — Alan B Waits
(74) *Attorney, Agent, or Firm* — Sughrue Mion, PLLC

(57) ABSTRACT

A rolling bearing has an outer diameter surface of the outer ring which is a fitting surface with a housing and the inner diameter surface of the inner ring, which is a fitting surface with a shaft. The outer diameter surface of the outer ring or the inner diameter surface of the inner ring is coated with a bonded film containing an organic binder, a solid lubricant powder such as molybdenum disulfide powder, and a friction/wear modifier such as antimony oxide powder. According to the rolling bearing, a creep resistance is kept excellent without causing increase in cost and size and being deformed and softened.

8 Claims, 3 Drawing Sheets

(56) References Cited

U.S. PATENT DOCUMENTS

| | | | | |
|---|---|---|---|---|
| 2012/0008890 A1* | 1/2012 | Schwarz | ................ | F16C 33/62 |
| | | | | 384/476 |
| 2012/0065296 A1 | 3/2012 | Fujimoto et al. | | |
| 2013/0016938 A1* | 1/2013 | Okada | ..................... | F16C 33/32 |
| | | | | 384/492 |
| 2014/0086520 A1 | 3/2014 | Niwa | | |
| 2014/0301880 A1* | 10/2014 | Horibe | ................. | C10M 147/02 |
| | | | | 418/55.1 |

FOREIGN PATENT DOCUMENTS

| | | | |
|---|---|---|---|
| CN | 203926439 U | | 11/2014 |
| JP | 6-99225 A | | 4/1994 |
| JP | 8-121361 A | | 5/1996 |
| JP | 10-37967 A | | 2/1998 |
| JP | 11-246823 A | | 9/1999 |
| JP | 2002-266870 A | | 9/2002 |
| JP | 2004-176785 A | | 6/2004 |
| JP | 2007-2912 A | | 1/2007 |
| JP | 2012-62355 A | | 3/2012 |
| JP | 2012-241875 A | | 12/2012 |
| JP | 2014228099 A * | 12/2014 | .............. F16C 33/62 |
| JP | 2015-199859 A | | 11/2015 |

OTHER PUBLICATIONS

Machine Translation of JP 2014-228099 (Year: 2014).*
Machine Translation of JP H11-246823 (Year: 1999).*
Machine Translation of JP H06-099225 (Year: 2006).*
Search Report dated Nov. 7, 2017, issued by the International Searching Authority in counterpart International Patent Application No. PCT/JP2017/030464 (PCT/ISA/210).
Written Opinion dated Nov. 7, 2017, issued by the International Searching Authority in counterpart International Patent Application No. PCT/JP2017/030464 (PCT/ISA/237).
Communication dated Oct. 30, 2019 issued by the State Intellectual Property Office of P.R. China in counterpart Chinese Application No. 201780050909.X.

* cited by examiner

ROLLING BEARING AND PRODUCTION PROCESS THEREFOR

TECHNICAL FIELD

The present invention relates to a rolling bearing that is to be used in a state where a raceway may creep relative to an opposite material such as a housing.

RELATED ART

For a variety of rotating mechanical apparatuses, reduction in size and weight is required. Therefore, some rolling bearings have been made to be thin. However, in a case of a rolling bearing in which an outer ring is fitted to a housing, when the outer ring is made to be thin, an outer diameter surface of the outer ring is largely deformed due to a load applied from a rolling element, so that outer ring creep occurs. At this time, the outer diameter surface of the outer ring and an inner surface of the housing are rubbed each other, so that wear occurs on the housing. When the wear of the housing increases, a backlash occurs at a rotation support part, so that abnormal vibration is generated and the rotating mechanical apparatus is out of order.

In order to prevent the creep of the outer diameter surface of the outer ring, for example, Patent Document 1 discloses that an axial shape of the outer diameter surface of the outer ring is formed to have an arc-shaped concave part, not a straight concave part. A bearing having the concave part formed on the outer diameter surface of the outer ring is press-fitted to the housing, and occurrence of the creep is prevented by interferences of both ends as large as possible. However, it is necessary to press-fit the bearing to the housing with a high force, so that the mounting is not easy.

In addition, a pin or a flange may be provided as a whirl stop. However, the number of components increases, and shapes of the bearing and the housing become complicated, so that the processing cost and the size increase. Furthermore, the operation of mounting the bearing to the housing is troublesome, so that the manufacturing cost also increases.

Patent Document 2 discloses coating the outer diameter surface of the outer ring with a lubrication coating made of a thermosetting synthetic resin composition containing molybdenum disulfide, antimony and the like. Since the lubrication coating has a lubricating property and is essentially made of resin, the lubrication coating is softer than aluminum or aluminum alloy, which is a general material of the housing. Also, even when the creep occurs, it is possible to prevent the wear of an inner peripheral surface of the housing. Also, since the lubrication coating has only to be formed, it is possible to cope with a variety of rolling bearings and the general versatility is also high. However, since the lubrication coating is obtained by applying a solution, in which the thermosetting synthetic resin composition containing molybdenum disulfide and the like is dissolved in a solvent, and heating the solution to evaporate the solvent, the film strength and durability may not be sufficiently secured.

Patent Document 3 discloses providing an O-ring on the outer diameter surface of the outer ring to fill a gap between the housing and the bearing and preventing the creep by a repulsive force of rubber forming the O-ring. However, when unexpected expansion occurs in the housing, the repulsive force of rubber is decreased, so that the creep may occur.

Patent Document 4 discloses increasing a thickness of the outer ring to enhance the stiffness, thereby suppressing elastic deformation of the outer ring to prevent the creep. However, in order to completely prevent the creep, the thickness of the outer ring should be considerably increased, so that the size of the bearing is increased, which is not preferable.

Patent Document 5 discloses coating a piston ring with a heat resistant resin containing molybdenum disulfide, antimony and the like. As the heat resistant resin, polyamideimide is used, and as a curing agent, phenol is used. However, since phenol is used as the curing agent, a thermal curing treatment is performed at 180° C. to 220° C., in an embodiment. In a case of SUJ2 that is widely used for a bearing, since a tempering temperature is about 120° C., the bearing may be deformed or softened at the high thermal curing temperature.

CITATION LIST

Patent Documents

Patent Document 1: JP-A-H10-37967
Patent Document 2: JP-A-2002-266870
Patent Document 3: JP-A-2004-176785
Patent Document 4: JP-A-2012-241875
Patent Document 5: JP-A-H11-246823

SUMMARY OF THE INVENTION

Problems to be Solved by the Invention

The present invention has been made in view of the above situations, and an object thereof is to implement a rolling bearing having a configuration in which an outer diameter surface of an outer ring is to be fitted to a housing and a shaft is to be fitted to an inner diameter surface of an inner ring and capable of stably keeping an excellent creep resistance for a long time, without causing increase in cost and size. Also, an object of the present invention is to prevent a bearing from being deformed and softened when forming a bonded film for increasing the creep resistance.

Means for Solving the Problems

In order to achieve the above objects, the present invention provides a following rolling bearing and a method of manufacturing the same.

(1) A rolling bearing including an outer ring, an inner ring, and a rolling element rollably arranged between the outer ring and the inner ring,
wherein at least one of an outer diameter surface of the outer ring and an inner diameter surface of the inner ring has a bonded film containing an organic binder comprising a base material and a curing agent, a solid lubricant powder, and a friction/wear modifier.

(2) The rolling bearing according to (1), wherein the curing agent comprises an epoxy, an epoxy curing agent, or both the epoxy and the epoxy curing agent.

(3) The rolling bearing according to (1) or (2), wherein in a section of the bonded film, the friction/wear modifier having a cross-sectional area of 1 µm² or larger occupies an area ratio of 2.5% or greater.

(4) The rolling bearing according to one of (1) to (3), wherein the base material is polyamideimide,
wherein the solid lubricant contains a molybdenum disulfide powder and graphite, and wherein the friction/wear modifier contains an antimony oxide powder.

(5) The rolling bearing according to one of (1) to (4), wherein a value obtained by dividing a mass of the solid lubricant by a mass of the friction/wear modifier is larger than 0.7 and smaller than 1.8.

(6) A method of manufacturing a rolling bearing including an outer ring, an inner ring, and a rolling element rollably arranged between the outer ring and the inner ring, the method including:

a process of applying a coating solution including an organic binder comprising a base material and a curing agent, a solid lubricant powder, and a friction/wear modifier to at least one of an outer diameter surface of the outer ring and an inner diameter surface of the inner ring, and a process of thermal curing the coating solution.

(7) The method according to (6), wherein the curing agent comprises an epoxy, an epoxy curing agent, or both the epoxy and the epoxy curing agent, and wherein the process of thermal curing is performed at 120° C. or lower.

Effects of the Invention

According to the rolling bearing of the present invention, the outer diameter surface of the outer ring, which is a fitting surface with a housing, or the inner diameter surface of the inner ring, which is a fitting surface with a shaft, is coated with the bonded film containing the organic binder, the solid lubricant powder such as molybdenum disulfide powder, and the friction/wear modifier such as antimony oxide powder. When polyamideimide is used as the base material of the organic binder and epoxy is used as the curing agent, it is possible to form a film at a tempering temperature or lower upon formation of the bonded film and to prevent the bearing from changing in size and being softened. Also, the bonded film is softer than aluminum or aluminum alloy (for example, die-cast material), which is a general material of the housing. Therefore, even when the outer ring creep occurs and the outer diameter surface of the outer ring and the aluminum housing are rubbed each other, the aluminum housing is not worn. Also, since the bonded film has high wear resistance, the rolling bearing of the present invention can keep the excellent creep resistance for a long time. Furthermore, since the bonded film is simply formed on the outer diameter surface of the outer ring or the inner diameter surface of the inner ring, the general versatility is high and the present invention can be applied to a variety of rolling bearings.

DETAILED DESCRIPTION OF EMBODIMENTS

Hereinafter, the present invention will be described in detail.

Figure 1:
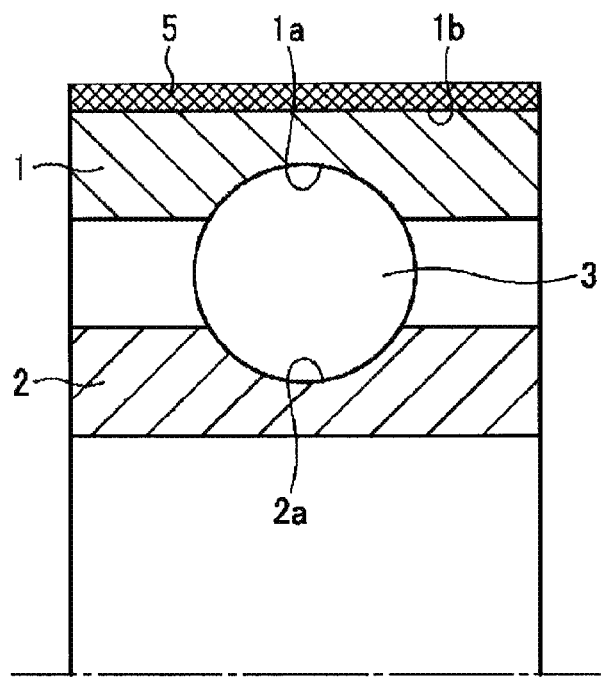
FIG. 1 is a sectional view depicting an example of a rolling bearing of the present invention.

In the present invention, a type of the rolling bearing is not limited, and a ball bearing as shown in FIG. 1 is here exemplified. The ball bearing includes an outer ring 1 having an outer ring raceway 1a, an inner ring 2 having an inner ring raceway 2a, and a plurality of balls 3 rollably arranged between both the raceways 1a, 2a. Also, an outer diameter surface 1b of the outer ring 1 of the ball bearing is fitted to a housing (not shown) and an inner peripheral surface of the inner ring 2 is fitted to a shaft member (not shown).

The outer ring 1 and the inner ring 2 are made of metal. For example, SUJ2, SCM420, SCr420, SCR420, SUS440 or the like subjected to quenching and tempering treatments or subjected to carburizing or nitrocarburizing treatment and quenching and tempering treatments is used.

In the embodiment, the outer diameter surface 1b of the outer ring 1 is coated with a bonded film 5 containing an organic binder, a solid lubricant powder, and a friction/wear modifier. The housing is made of aluminum or aluminum alloy (for example, aluminum die-cast material) for reducing in weight, in many cases. However, since the bonded film 5 of the present invention is softer than aluminum or aluminum alloy (for example, aluminum die-cast material), the housing is not damaged even though the outer diameter surface 1b of the outer ring and the housing is sliding contacted to each other.

The organic binder has high adhesiveness and wear resistance, so that the wear of the housing is small and a creep resistance wear characteristic is improved. The organic binder of the present invention has a curing agent mixed in a base material. Preferably, polyamideimide is used as the base material, and one or both of epoxy and epoxy curing agent is used as the curing agent. Polyamideimide and at least one of the epoxy and the epoxy curing agent are used, so that a treatment at a tempering temperature (120° C.) or lower can be performed and a change in size due to deformation of the bearing and reduction in hardness due to softening are not caused.

Although the epoxy is not particularly limited, bisphenol A type, cresol novolac type, biphenyl type, brominated epoxy resin, alicyclic epoxy resin and the like may be exemplified. Also, although the epoxy curing agent is not particularly limited, aliphatic polyamine, polyaminoamide, polymercaptan, aromatic polyamine, acid anhydride, dicyandiamide and the like may be exemplified. In the meantime, a curing promoter may be together used so as to increase reactivity of the epoxy curing agent, and tertiary amine, tertiary amine salt, imidazole, phosphine, phosphonium salt, sulfonium salt and the like may be used.

The solid lubricant powder is required to have lubrication performance and to be softer than aluminum or aluminum alloy, which is a representative material of the housing. As the solid lubricant, molybdenum disulfide is preferable. Molybdenum disulfide may be singly used or may be used together with a solid lubricant, which is softer than the material of the housing, such as graphite, tungsten disulfide, polytetrafluoroethylene (PTFE) and the like, as required. That is, the solid lubricant powder is molybdenum disulfide powder or mixed powder of molybdenum disulfide powder and graphite and the like.

The wear/friction modifier is an additive for suppressing creep and improving the wear resistance of the bonded film, and is preferably a solid material having hardness equal to or less than the housing. Specifically, a material having Hv 50 to 150 is preferable. Specifically, antimony oxide, tin, copper, zinc, nickel, talc, mica, potassium titanate and the like may be exemplified. Particularly, antimony oxide is preferable.

In order to form the bonded film 5, the organic binder dissolved in an appropriate solvent (for example, N-methyl-2-pyrrolidone (NMP), xylene or the like) is added with predetermined amounts of powders of the solid lubricant (molybdenum disulfide, graphite, PTFE or the like) and powders of the wear/friction modifier (antimony oxide), so that a coating solution is formulated. In order to uniformly mix/disperse the powders in the coating solution, milling is performed with a ball mill or the like. Then, the coating solution is applied to a workpiece (for example, the outer diameter surface 1b of the outer ring 1) by dipping, spraying or the like, and is baked for thermal curing in an oven such as a thermostatic bath. During the thermal curing, the solvent is evaporated, so that a coating consisting of the organic binder and the powders (the solid lubricant and the friction/wear modifier) is obtained after the thermal curing. The thermal curing temperature is 120° C. or lower when polyamideimide is used as the base material of the organic binder and epoxy is used as the curing agent, and the bearing can be prevented from being deformed and softened.

In the meantime, during the coating, a preheat treatment may be performed so as to prevent non-uniformity and dripping due to abrupt boiling of the solvent upon the baking. Also, in order to smoothen the sprayed film, a small amount (about 0.1%) of leveling agent may be added to the solvent. An average particle diameter of the solid lubricant powder and the raw material powder of the wear/friction modifier is appropriately 1 μm to 30 μm.

In the bonded film 5, a ratio (P/B) of the powders P comprising the solid lubricant and the friction/wear modifier and the organic binder B comprising the base material and the curing agent is preferably 0.43<(P/B)<2.3 by mass ratio. When the ratio (P/B) is smaller than 0.43, the powder components (the solid lubricant and the friction/wear modifier) included in the bonded film 5 are too small, so that the solid lubrication action and the friction/wear modification action do not sufficiently function and the wear resistance of the bonded film 5 is lowered. On the other hand, when the ratio (P/B) is greater than 2.3, the powder components included in the bonded film 5 are too much and an amount of the organic binder is relatively reduced. Therefore, the powders cannot be anchored, so that it is not possible to keep the wear resistance of the bonded film 5 for a long time. More preferably, the ratio is 0.67<(P/B)<1.5.

Also, a mixing ratio of the solid lubricant and the friction/wear modifier has an optimal range, in which (solid lubricant amount/friction/wear modifier amount) is a value greater than 0.7 and smaller than 1.8 by mass ratio, more preferably, 1.0 to 1.5. When the mixing ratio of the solid lubricant is greater than 1.8, a ratio of the friction/wear modifier, which is thought to mainly contribute to the wear resistance of the bonded film 5, becomes smaller, so that the wear resistance of the bonded film 5 is lowered. On the other hand, when the mixing ratio of the solid lubricant is smaller than 0.7, a shear force acting on a surface of the bonded film 5 becomes large, so that the bonded film 5 is likely to be worn.

Also, a particle diameter of the friction/wear modifier highly influences the creep wear characteristic. Since the friction/wear modifier bears a load to be applied to the bonded film 5, the larger the friction/wear modifier is, the wear resistance of the bonded film 5 is improved. Also, even though the surface of the bonded film 5 is worn, when the friction/wear modifier is large, the friction/wear modifier is not simply detached from the bonded film 5 and stays in the film. Accordingly, the friction/wear modifier that is large to some extent is preferably much contained in the bonded film 5, and an area ratio of the friction/wear modifier having a cross-sectional area of 1 μm$^2$ or larger in a section of the bonded film 5 is preferably 2.5% or greater, and more preferably 3% or greater. In the meantime, as described later, a film thickness of the bonded film 5 is preferably 5 μm to 100 μm. If the area ratio exceeds 15%, when the bonded film 5 is thin, specifically, the thickness of the bonded film 5 is about 10 μm, powder particles equal to or larger than the film thickness exist, so that the surface smoothness of the bonded film 5 is deteriorated and the size precision is not secured. For this reason, the area ratio is preferably 15% or less.

Meanwhile, in order to achieve the area ratio, the wear/friction modifier having the average particle diameter of 3 μm to 8 μm is preferably contained in the bonded film 5, in an amount of 10 mass % to 30 mass % to a total weight of the bonded film.

The film thickness of the bonded film 5 is preferably 5 μm to 100 μm. When the film thickness is smaller than 5 μm, the bonded film 5 is worn at an early stage and the creep wear resistance cannot be kept for a long time. Also, it is difficult to uniformly form the bonded film having the thin film thickness less than 5 μm. On the other hand, when the film thickness exceeds 100 μm, the film strength is lowered, so that the bonded film 5 may be peeled off. The film thickness is more preferably 5 μm to 50 μm.

As a pretreatment for forming the bonded film 5, a phosphoric acid chemical conversion treatment is preferably performed. By the phosphoric acid chemical conversion treatment, the adhesiveness between the bonded film 5 and the outer diameter surface of the outer ring 1b is enhanced. As phosphate that is used in the phosphoric acid chemical conversion treatment, manganese phosphate, zinc phosphate, zinc calcium phosphate, iron phosphate and the like may be exemplified. A phosphate chemical conversion coating is formed by the phosphoric acid chemical conversion treatment. The phosphate chemical conversion coating has excellent adhesiveness with the outer diameter surface of the outer ring 1b, concavity and convexity is formed on a surface thereof, and the bonded film 5 enters the concavity and convexity, so that the adhesiveness with the bonded film 5 is also enhanced. For this reason, the outer diameter surface of the outer ring 1b is difficult to be exposed, and the creep wear resistance is improved. Also, when the bearing steel is a material that cannot be subjected to the chemical conversion treatment, such as SUS440, the surface is roughened by shot blasting processing or the like, so that the adhesiveness can be improved.

Figure 2:
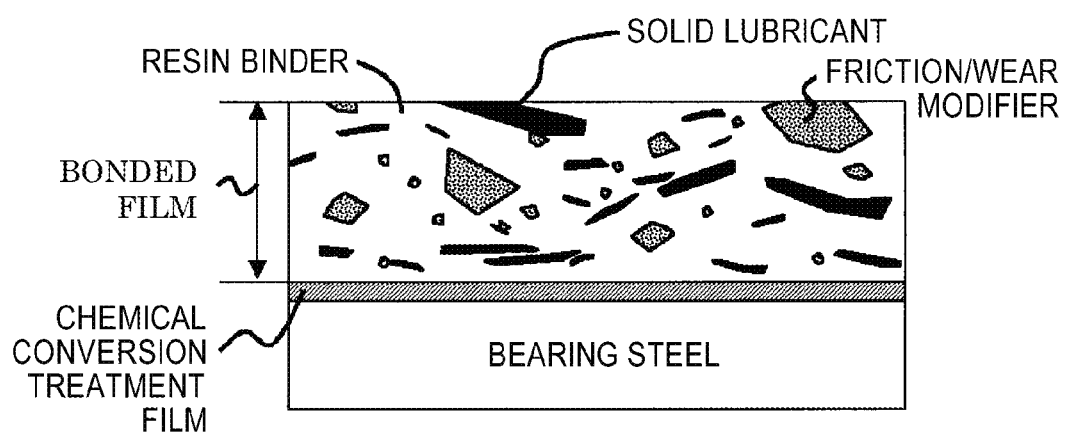
FIG. 2 is a pictorial view for illustrating a film structure on an outer diameter surface of an outer ring.

FIG. 2 pictorially depicts a section of the bonded film 5 formed by interposing a chemical conversion coating on an outer diameter surface of the bearing. In the film, the powder-shaped solid lubricant (black portions) and the wear/friction modifier (hatched portions) are dispersed and are bound by the organic binder. The respective actions of the solid lubricant and the wear/friction modifier are exhibited in a balanced manner, so that the favorable creep resistance is kept for a long time.

From the above, the bonded film and the undercoating (pretreatment) of the present invention preferably have following configurations.

(1) The organic binder, the solid lubricant powder, and the friction/wear modifier are contained.

(2) The organic binder includes epoxy and polyamideimide, and a content of the organic binder is 40 mass % to 60 mass % of a total mass of the bonded film.

(3) The solid lubricant powder includes molybdenum disulfide and graphite, a content of molybdenum disulfide to the total mass of the bonded film is 12 mass % to 34 mass %, and a content of graphite to the total mass of the bonded film is 2 mass % to 8 mass %.

(4) The friction/wear modifier includes antimony oxide, and a content thereof is 15 mass % to 30 mass % to the total mass of the bonded film.

(5) The area ratio of the friction/wear modifier having a cross-sectional area 1 $\mu m^2$ or larger is 3% or greater in the section of the bonded film.

(6) A value obtained by dividing mass of the solid lubricant by mass of the friction/wear modifier is 1 to 1.5.

(7) The film thickness of the bonded film is 5 μm to 50 μm.

(8) As the undercoating, a chemical conversion film including phosphoric acid is provided.

In the embodiment, the ball bearing has been exemplified. However, the present invention is not limited thereto. For example, the present invention can be applied to the other rolling bearings such as a cylindrical roller bearing, a tapered roller bearing, and the like. Also, since the bonded film is simply formed on the outer diameter surface of the outer ring, it is possible to easily cope with a variety of bearings.

Figure 3:
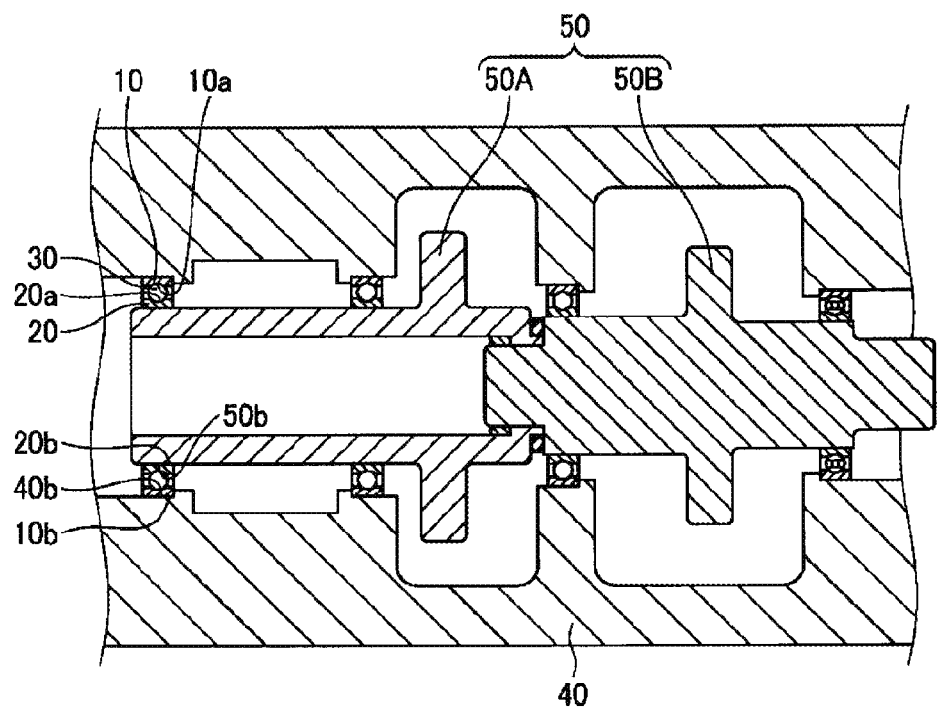
FIG. 3 is a sectional view depicting an example of a transmission for an automobile.

Also, as a utility in which the outer ring 1 of the rolling bearing is to be fitted to the housing, a transmission for an automobile may be exemplified. FIG. 3 is a sectional view depicting an example thereof, in which a shaft member 50 is arranged inside a housing 40 and the shaft member 50 is rotatably supported by a plurality of rolling bearings. In the meantime, the shaft member 50 is configured by two members 50A, 50B. The rolling bearing includes an outer ring 10, an inner ring 20, and a plurality of balls 30 rollably arranged between respective raceways 10a, 20a, an outer diameter surface 10b of the outer ring 10 is fitted to an inner peripheral surface 40b of the housing 40 by interference fitting or the like, and an inner diameter surface 20b of the inner ring 20 is fitted to an outer peripheral surface 50b of the shaft member 50 by interference fitting or the like. According to the present invention, the outer diameter surface 10b of the outer ring 10 of the rolling bearing is formed with the bonded film 5 for preventing the wear.

In addition, the present invention can be applied to a general rolling bearing having a structure where the outer diameter surface of the outer ring is to be fitted to the housing.

Also, when the creep is to be caused in the inner ring and a shaft, the bonded film of the present invention may be formed on the inner diameter surface of the inner ring 2.

Embodiments

In the below, the present invention will be further described with reference to test examples. However, it should be noted that the present invention is not limited thereto.

(Embodiment 1, Comparative Example 1)

In this test, the effects that are to be accomplished by the bonded film of the present invention was verified.

As shown in Table 1, the organic binder comprising epoxy and polyamideimide, molybdenum disulfide powders ("$MoS_2$" in Table), antimony oxide powders ("$Sb_2O_3$" in Table), graphite powders ("C" in Table) were dispersed in N-methyl-2-pyrrolidone in the shown amounts, so that the coating solution was formulated. Also, the average particle diameter of the raw material powders of molybdenum disulfide was set to 3 μm, and the average particle diameter of the raw material powders of antimony oxide was set to 8 μm. As the undercoating treatment, a chemical conversion coating of manganese phosphate was formed, and the coating solution was applied to the outer diameter surface of the outer ring of the test bearing, which was then thermal cured at 120° C. for 30 minutes to form the bonded film. The film thickness of the bonded film was set to 15 μm.

Figure 4:
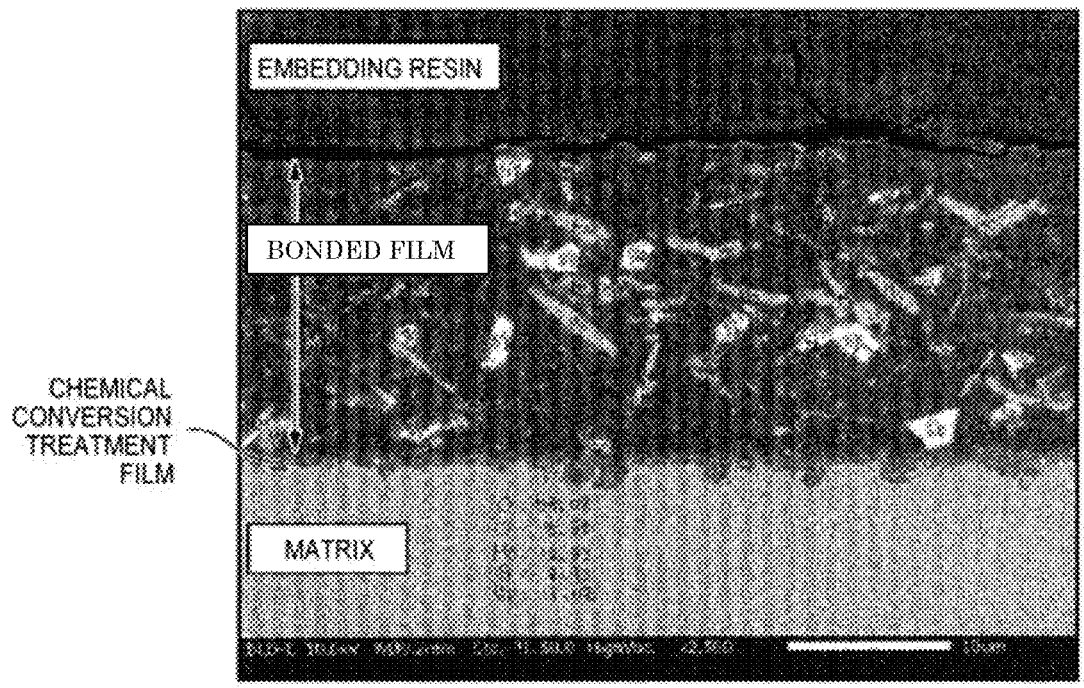
FIG. 4 is a photograph obtained by a scanning electron microscope, depicting an example of a section of the outer diameter surface of the outer ring.

FIG. 4 depicts an example of a SEM (Scanning Electron Microscope) photograph of the bonded film of Embodiment 1. In the photograph, platinum coating was performed for SEM observation. Also, in the photograph, molybdenum disulfide powder is denoted as "Mo", and antimony oxide powder is denoted as "Sb". From the photograph, it can be seen that molybdenum disulfide powders and antimony oxide powders are dispersed in the bonded film.

For the test bearing (Embodiment 1) having the bonded film formed thereon and a test bearing (Comparative Example 1) with no bonded film, a bearing test was performed with a following condition 1 in a state where the outer ring was fitted to the housing made of aluminum alloy, so as to evaluate a creep wear amount of the housing. In the meantime, the creep wear amount was obtained from a weight difference of the housing before and after the test.

<Bearing Test Condition 1>
test bearing: deep groove type bearing (outer diameter 39 mm, inner diameter 17 mm)
bearing material: bearing steel (SUJ2)
housing: aluminum alloy
test radial load: 3577N
inner ring revolution: 3900 $min^{-1}$
atmosphere: CTV fluid, forced supply lubrication
test temperature: 100° C.
hour: 48 hours
evaluation items: wear amount of housing The results are shown in Table 1. In the results, the value is described when the creep wear amount of Comparative Example 1 is set to 1.

TABLE 1

| | Powders | | | | Binder | |
| --- | --- | --- | --- | --- | --- | --- |
| | Total amount (P) (mass %) | $MoS_2$ amount (mass %) | C amount (mass %) | $Sb_2O_3$ amount (mass %) | amount (B) (mass %) | Creep wear amount |
| Embodiment 1 | 50 | 25 | 5 | 20 | 50 | 0.05 |
| Comparative Example 1 | No chemical conversion treatment film and bonded film | | | | | 1 |

It can be seen that the creep wear is smaller in the bonded film of the present invention.

(Embodiments 2 and 3, Comparative Examples 2 to 4)

In this test, in order to examine an influence of the friction/wear modifier (antimony oxide) included in the bonded film, the test bearing having the bonded film of the composition shown in Table 2 was evaluated with the above condition 1. Also, the average particle diameter of the raw material powders of molybdenum disulfide was set to 3 μm, and the average particle diameter of the raw material powders of antimony oxide was set to 1 μm. In the meantime, as the undercoating treatment, the chemical conversion treatment using manganese phosphate was performed, and polyamideimide was used as the organic binder and the epoxy was used as the curing agent. Also, the film thickness of the bonded film was set to 15 μm. The results are shown by a relation of the [(solid lubricant)/(friction/wear modifier)] ratio and the housing wear amount, in Table 2. The wear amount of the housing is shown by the weight ratio when Comparative Example 2 is set to 1. The small value thereof indicates that the wear of the housing due to the creep phenomenon is small.

When the amount of the solid lubricant is large in the bonded film, the ratio of the friction/wear modifier, which is thought to mainly contribute to the wear resistance of the bonded film, becomes smaller, so that the wear resistance of the bonded film is lowered. On the other hand, when the amount of the solid lubricant is small, a shear force acting on the surface of the bonded film becomes large, so that the bonded film is likely to be worn. Accordingly, it is thought that the mixing ratio between the solid lubricant and the friction/wear modifier has the optimal value as described above.

(Embodiments 4 and 5, Comparative Examples 5 and 6)

In this test, an influence of the particle diameter of the friction/wear modifier included in the bonded film was examined.

Before examining the influence of the particle diameter, it was examined how to define the particle diameter of the friction/wear modifier to be dispersed in the bonded film. Basically, a section of the bonded film is observed by a scanning electron microscope (SEM), and the elements are identified by an energy dispersive X-ray spectroscopy (EDX) attached to the scanning electron microscope. A sample is manufactured by cutting the outer diameter surface of the outer ring having the bonded film coated thereon, embedding the same in a resin and grinding a surface thereof. At this time, platinum coating is performed for the SEM observation.

FIG. 4 (Embodiment 1) depicts an example of the section observation of the bonded film. In FIG. 4, the elements identified by the EDX are shown. In FIG. 4, Mo indicates $MoS_2$, and Sb indicates $Sb_2O_3$. As shown, $MoS_2$ has an elongated shape, $Sb_2O_3$ has a polygonal or circular shape, and $MoS_2$ and $Sb_2O_3$ are dispersed in the bonded film. In this example, as the raw material powder, antimony oxide having an average particle diameter of 8 μm was used. As can be seen from FIG. 4, the particle diameter of antimony oxide in the bonded film is smaller than the average particle diameter of the raw material powders. The reason is that when formulating the coating solution, which is a raw material of the bonded film, the milling process was performed. For this reason, it is not possible to define the particle diameter of antimony oxide in the bonded film by the average particle diameter of the raw material powders. Also, it is actually impossible to obtain the particle diameter of antimony oxide in the bonded film because it is necessary to perform the identification for the very small particles.

Therefore, a section of the bonded film is observed, and a ratio ($Sb_2O^3$ area ratio), which indicates that antimony

TABLE 2

|  | Powders | | | | Binder | [(solid lubricant)/ | |
| --- | --- | --- | --- | --- | --- | --- | --- |
|  | Total amount (P) (mass %) | $MoS_2$ amount (mass %) | C amount (mass %) | $Sb_2O_3$ amount (mass %) | amount (B) (mass %) | (friction/wear modifier)] ratio | Housing wear amount |
| Comparative Example 2 | 50 | 45 | 5 | 0 | 50 | — | 1.0 |
| Comparative Example 3 | 50 | 29 | 5 | 16 | 50 | 2.2 | 0.35 |
| Comparative Example 4 | 50 | 13.5 | 5 | 31.5 | 50 | 0.6 | 0.5 |
| Embodiment 2 | 50 | 25 | 5 | 20 | 50 | 1.5 | 0.1 |
| Embodiment 3 | 50 | 20 | 5 | 25 | 50 | 1.0 | 0.1 | notes)
the solid lubricant amount is a sum amount of $MoS_2$ and C.

Figure 5:
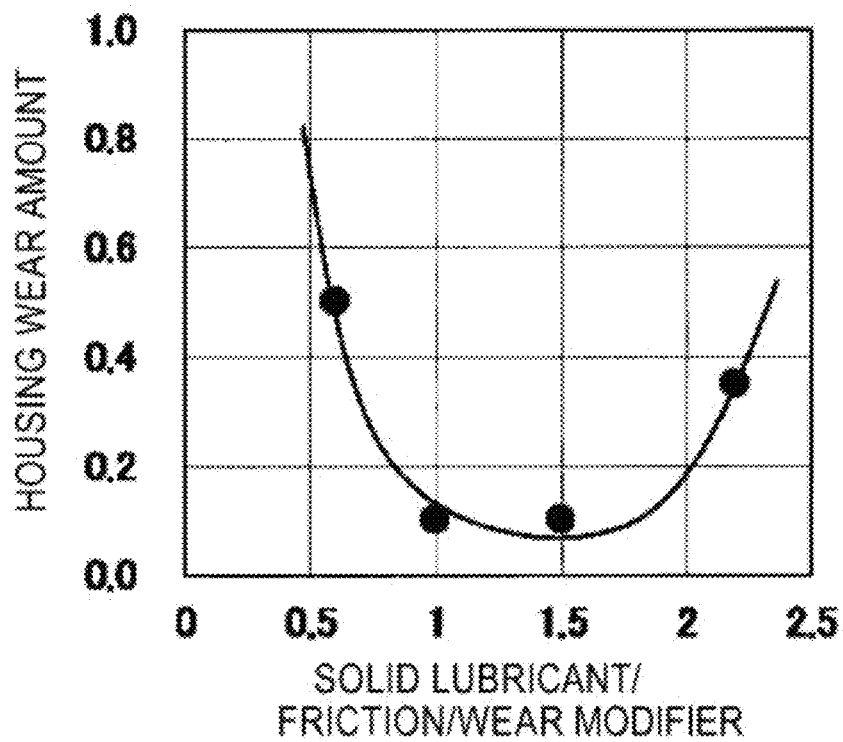
FIG. 5 is a graph obtained in an embodiment, depicting a relation between a [(solid lubricant)/(friction/wear modifier)] ratio and a wear amount of a housing.

Also, the similar test was performed with a following condition 2. The results are shown with a graph in FIG. 5. It can be seen that the wear amount of the housing changes due to the influence of the [(solid lubricant)/(friction/wear modifier)] ratio. From Table 2 and FIG. 5, it can be seen that the [(solid lubricant)/(friction/wear modifier)] ratio has an optimal range and that within a range greater than 0.7 and smaller than 1.8, the housing wear amount is considerably reduced and the wear due to the creep is reduced, as compared to Comparative Example 2 in which only the solid lubricant is included and the friction/wear modifier is not included. The more preferable range of the [(solid lubricant)/(friction/wear modifier)] ratio is 1.0 to 1.5, in which the wear amount is reduced by about 10%, as compared to Comparative Example 2.

<Bearing Test Condition 2>
test bearing: deep groove type bearing (outer diameter 53 mm, inner diameter 30 mm, thickness: 13 mm)
bearing material: bearing steel (SUJ2)
housing: aluminum alloy
test radial load: 7300N
inner ring revolution: 3900 $min^{-1}$
atmosphere: FBK oil RO 68 available from JX Nippon Oil, forced supply circulation
test temperature: about 100° C.
hour: 48 hours
evaluation items: wear amount of housing oxide having a cross-sectional area of 1 μm² or larger occupies in the section of the bonded film, is used. The large value thereof indirectly means that the particle diameter of antimony oxide in the bonded film is large. A total area of the particles having a cross-sectional area of 1 μm² or larger is calculated using the particle analysis of image analysis software (ImageJ). At this time, molybdenum disulfide powders and antimony oxide powders in the bonded film are extracted by binarization of an image or a setting of roundness. When a result thereof is different from the result of the EDX, a following method is performed. First, a section of the bonded film is photographed, and particles to be extracted in the photograph are compactly colored with ink. Then, the photograph is read by a scanner, and the image analysis is performed for the data. According to the particle analysis performed for FIG. 4 by the above method, the area ratio of antimony oxide powders included in the section of the bonded film and having a cross-sectional area of 1 μm² or larger was 3.1%. In the meantime, the area ratio of molybdenum disulfide powders included in the section of the bonded film and having a cross-sectional area of 1 μm² or larger can also be calculated by a similar method.

During the test, in Embodiment 2, the area ratio of antimony oxide powders in the bonded film was changed by changing the average particle diameter of the raw material powders of antimony oxide to be added. That is, as the undercoating treatment, the chemical conversion treatment using manganese phosphate was performed, polyamideimide was used as the organic binder, the epoxy was used as the curing agent, the average particle diameter of the raw material powders of molybdenum disulfide was unchanged and the average particle diameter of the raw material powders of antimony oxide was changed, so that the bonded film was formed on the test bearing. The film thickness of the bonded film was set to 15 μm. Table 3 shows the average particle diameter of the raw material powders of molybdenum oxide and the area ratio of antimony oxide powders having a cross-sectional area of 1 μm² or larger in the bonded film.

Figure 6:
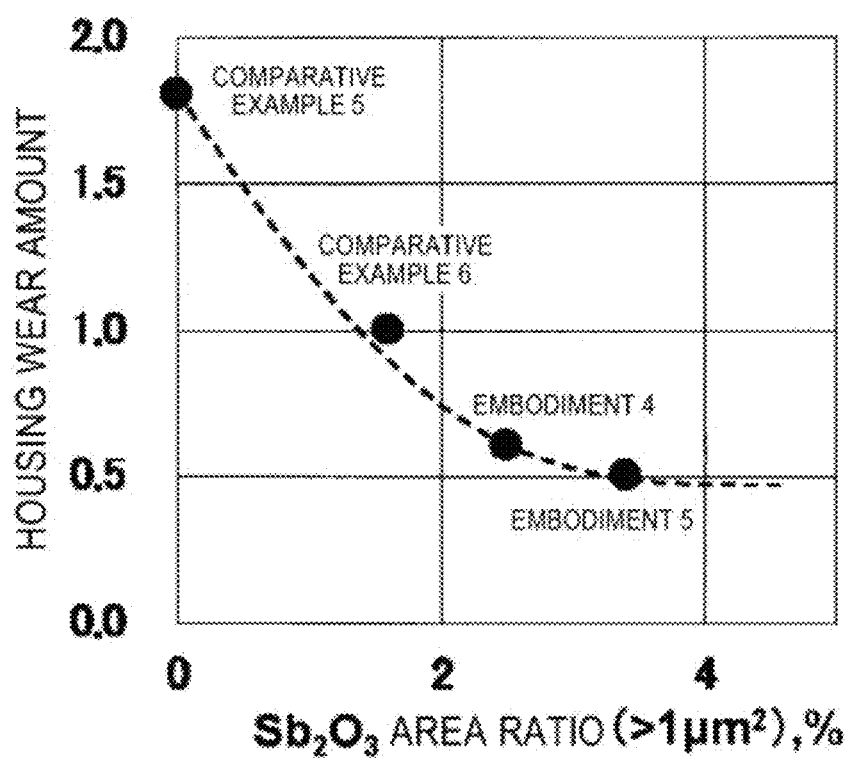
FIG. 6 is a graph obtained in an embodiment, depicting a relation between an area ratio of antimony oxide ($Sb_2O_3$) having a cross-sectional area 1 $\mu m^2$ or larger in a section of a bonded film and the wear amount of the housing.

The housing wear amount was measured using the test bearing, in accordance with a following condition 3. The results are shown in Table 3 and FIG. 6. In the meantime, the wear amount of the housing is indicated by a relative value when the wear amount of Comparative Example 6 is set to 1. The small value thereof means that the wear of the housing due to the creep phenomenon is small.

<Bearing Test Condition 3>
test bearing: deep groove type bearing (outer diameter 53 mm, inner diameter 30 mm, thickness: 13 mm)
bearing material: bearing steel (SUJ2)
housing: aluminum alloy
test radial load: 7300N
inner ring revolution: 3900 min$^{-1}$
atmosphere: Nissan CVT fluid NS-3, forced supply circulation
test temperature: about 100° C.
hour: 48 hours
evaluation items: wear amount of aluminum housing when the outer ring is rotated by 250 revolutions by the creep

TABLE 3

| | average particle diameter of raw material powders (μm) | housing wear amount | $Sb_2O_3$ area ratio (%) |
|---|---|---|---|
| Comparative Example 5 | 0.1 | 1.8 | 0.0 |
| Comparative Example 6 | 1 | 1.0 | 1.6 |
| Embodiment 4 | 3 | 0.6 | 2.5*[1] |
| Embodiment 5 | 8 | 0.5 | 3.4 |

*[1] the value obtained by an approximate equation (approximate equation: y = 0.77ln(x) + 1.7) when the average particle diameter of the raw material powders of Comparative Example 5, Comparative Example 6 and Embodiment 5 is denoted with x and $Sb_2O_3$ area ratio is denoted with y.

From the results, it can be seen that the larger the area ratio of antimony oxide powders is, the wear amount of the housing is reduced. As one reason, it is thought that since the antimony oxide powders bear a load to be applied to the bonded film, the antimony oxide powders, which are large to some extent, in the film improved the wear resistance of the bonded film. Also, another reason, it is thought that even though the surface of the bonded film is worn, when the antimony oxide powders are large to some extent, the antimony oxide powders stay in the film without being detached from the bonded film. Therefore, the area ratio of antimony oxide having a cross-sectional area of 1 μm² or larger in the section of the bonded film is preferably 2.5% or greater, and more preferably 3% or greater. The area ratio of antimony oxide is preferably greater. However, if the area ratio exceeds 15%, when the bonded film is thin, for example, the thickness of the bonded film is about 10 μm, powder particles equal to or larger than the film thickness of the bonded film exist, so that the surface smoothness of the bonded film is deteriorated and the size precision is not secured. For this reason, the area ratio of antimony oxide is preferably 15% or less.

Also, when comparing the time consumed to reach the predetermined revolutions (for example, 250 revolutions), it was confirmed that the larger antimony oxide (the greater area ratio) requires the longer time. That is, it is thought that the size of antimony oxide suppresses the creep itself.

Meanwhile, the molybdenum disulfide powders were also examined with respect to the influence of the average particle diameter of the raw material powders thereof by changing the average particle diameter (3 μm, 16 μm). However, it was checked that there was no substantial influence. That is, since the solid lubricant reduces the shear force acting on the surface of the bonded film, it is thought that the solid lubricant contributes to the improvement on the wear resistance of the bonded film. However, it is guessed that this action is not influenced by the particle diameter.

From the above results, it can be seen that it is possible to reduce the creep wear by the bonded film of the present invention.

Although the present invention has been described in detail with reference to the specific embodiments, it is obvious to one skilled in the art that a variety of changes and modifications can be made without departing from the spirit and scope of the present invention.

The subject application is based on Japanese Patent Application Nos. 2016-165994 filed on Aug. 26, 2016 and 2017-153165 filed on Aug. 8, 2017, the contents of which are incorporated herein by reference.

INDUSTRIAL APPLICABILITY

The rolling bearing of the present invention has the excellent creep resistance, and is useful for a utility that is to be used in a state where the raceway may creep relative to the opposite material such as a housing, for example, for a rolling bearing that is to be used for a transmission for an automobile.

DESCRIPTION OF REFERENCE NUMERALS

1: outer ring
1a: outer ring raceway
1b: outer diameter surface
2: inner ring
2a: inner ring raceway
3: ball
5: bonded film

The invention claimed is:

1. A rolling bearing including an outer ring, an inner ring, and a rolling element rollably arranged between the outer ring and the inner ring,
wherein an outer diameter surface of the outer ring is configured to be fitted to a first member, an inner diameter surface of the inner ring is configured to be fitted to a second member, and the first member and the second member are rotatable relative to one another,
wherein at least one of the outer diameter surface of the outer ring and the inner diameter surface of the inner ring has a bonded film containing an organic binder comprising a base material and a curing agent, a solid lubricant powder, and a friction/wear modifier,
wherein in a section of the bonded film, the friction/wear modifier having a cross-sectional area of 1 μm$^2$ or larger occupies an area ratio of 2.5% or greater,
wherein the solid lubricant contains a molybdenum disulfide powder and graphite, and
wherein the friction/wear modifier contains an antimony oxide powder.

2. The rolling bearing according to claim 1,
wherein a value obtained by dividing a mass of the solid lubricant by a mass of the friction/wear modifier is larger than 0.7 and smaller than 1.8.

3. The rolling bearing according to claim 2,
wherein the base material is a polyamideimide, and
wherein the curing agent comprises an epoxy, an epoxy curing agent, or both the epoxy and the epoxy curing agent.

4. The rolling bearing according to claim 1,
wherein the base material is a polyamideimide, and
wherein the curing agent comprises an epoxy, an epoxy curing agent, or both the epoxy and the epoxy curing agent.

5. A method of manufacturing a rolling bearing including an outer ring, an inner ring, and a rolling element rollably arranged between the outer ring and the inner ring,
wherein an outer diameter surface of the outer ring is configured to be fitted to a first member, an inner diameter surface of the inner ring is configured to be fitted to a second member, and the first member and the second member are rotatable relative to one another, and
wherein the method including:
a process of applying a coating solution including an organic binder comprising a base material and a curing agent, a solid lubricant powder, and a friction/wear modifier to at least one of the outer diameter surface of the outer ring and the inner diameter surface of the inner ring, and
a process of thermal curing the coating solution;
wherein in a section of the bonded film, the friction/wear modifier having a cross-sectional area of 1 μm$^2$ or larger occupies an area ratio of 2.5% or greater,
wherein the solid lubricant contains a molybdenum disulfide powder and graphite, and
wherein the friction/wear modifier contains an antimony oxide powder.

6. The method according to claim 5,
wherein the base material is a polyamideimide, and
wherein the curing agent comprises an epoxy, an epoxy curing agent, or both the epoxy and the epoxy curing agent.

7. The method according to claim 5,
wherein the coating solution is thermal cured at 120° C. or lower.

8. The method according to claim 5,
wherein a value obtained by dividing a mass of the solid lubricant by a mass of the friction/wear modifier is larger than 0.7 and smaller than 1.8.

* * * * *